(12) United States Patent
Wang et al.

(10) Patent No.: US 10,306,544 B2
(45) Date of Patent: May 28, 2019

(54) WI-FI CONTENTION REDUCTION

(71) Applicant: InterDigital Patent Holdings, Inc., Wilmington, DE (US)

(72) Inventors: Xiaofei Wang, Cedar Grove, NJ (US); Guodong Zhang, Syosset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 33 days.

(21) Appl. No.: 15/033,634

(22) PCT Filed: Nov. 7, 2014

(86) PCT No.: PCT/US2014/064494
§ 371 (c)(1),
(2) Date: Apr. 30, 2016

(87) PCT Pub. No.: WO2015/069987
PCT Pub. Date: May 14, 2015

(65) Prior Publication Data
US 2016/0286469 A1    Sep. 29, 2016

Related U.S. Application Data

(60) Provisional application No. 61/902,023, filed on Nov. 8, 2013.

(51) Int. Cl.
*H04L 12/801* (2013.01)
*H04B 1/50* (2006.01)
(Continued)

(52) U.S. Cl.
CPC ........... *H04W 48/16* (2013.01); *H04W 48/14* (2013.01); *H04W 74/006* (2013.01); *H04W 84/12* (2013.01)

(58) Field of Classification Search
CPC ... H04W 48/08; H04W 52/02; H04W 74/006; H04W 78/08
See application file for complete search history.

(56) References Cited

U.S. PATENT DOCUMENTS 7,710,930 B2   5/2010  Kwak
8,463,175 B2   6/2013  Bajko
(Continued)

FOREIGN PATENT DOCUMENTS

CN    101231253 A    7/2008

OTHER PUBLICATIONS

Gong et al., "11ah Channelization of China", IEEE 802.11-11/1320r0, Sep. 21, 2011, pp. 1-5.
(Continued)

*Primary Examiner* — Faruk Hamza
*Assistant Examiner* — Abusayeed M Haque
(74) *Attorney, Agent, or Firm* — Volpe and Koenig, P.C.

(57) ABSTRACT

Systems, methods, and instrumentalities are disclosed for reducing contention in a wireless network. An IEEE 802.11 station (STA) may send a request frame to an IEEE 802.11 access point (AP). The AP may be able to accommodate the IEEE 802.11 STA. The STA may receive a response frame that may include a basic service set (BSS) discovery policy. The IEEE 802.11 STA may send a revised request frame, when the indicated BSS discover method is active scanning. The revised request frame may be sent based on the BSS discovery policy received from the IEEE 802.11 AP during the period of time. The IEEE 802.11 STA may send the revised request frame, e.g., when time elapsed since last second request exceeds an active scanning interval. The IEEE 802.11 STA may refrain from sending the second
(Continued)

request frame, e.g., when the indicated BSS discovery method received from the IEEE 802.11 AP is passive scanning.

20 Claims, 11 Drawing Sheets

(51) Int. Cl.
*H04W 84/18* (2009.01)
*H04L 1/00* (2006.01)
*H04W 48/16* (2009.01)
*H04W 74/00* (2009.01)
*H04W 48/14* (2009.01)
*H04W 84/12* (2009.01)

(56) References Cited

U.S. PATENT DOCUMENTS

| | | | |
|---|---|---|---|
| 8,467,784 | B2 | 6/2013 | Balasubramanian et al. |
| 9,350,428 | B2* | 5/2016 | Kang .................. H04B 7/0452 |
| 9,980,296 | B2 | 5/2018 | Wang et al. |
| 2006/0079241 | A1* | 4/2006 | Faccin .................. H04W 36/18 455/450 |
| 2007/0149230 | A1 | 6/2007 | Song et al. |
| 2011/0222520 | A1* | 9/2011 | Montemurro ....... H04W 74/006 370/338 |
| 2011/0225272 | A1 | 9/2011 | Montemurro et al. |
| 2012/0120892 | A1* | 5/2012 | Freda .................... H04W 8/005 370/329 |
| 2013/0258859 | A1* | 10/2013 | Huang .................. H04W 24/10 370/241 |
| 2013/0294270 | A1* | 11/2013 | Yang .................... H04W 48/16 370/252 |
| 2013/0294354 | A1 | 11/2013 | Zhang et al. |
| 2013/0335650 | A1* | 12/2013 | Wakabayashi ...... G02F 1/13306 349/33 |
| 2014/0003282 | A1* | 1/2014 | Kafle ...................... H04W 4/02 370/254 |
| 2015/0043366 | A1* | 2/2015 | Kneckt ............... H04L 43/0852 370/252 |
| 2015/0049686 | A1* | 2/2015 | Liang .................. H04W 74/006 370/329 |
| 2015/0063128 | A1* | 3/2015 | Garikipati ............ H04B 7/0417 370/252 |
| 2015/0117322 | A1* | 4/2015 | McGrath ............... H04W 72/00 370/329 |

OTHER PUBLICATIONS

Park, et al., "HEW SG Evaluation Methodology", IEEE 802.11-13/0722r1, Jul. 2013, pp. 1-17.
IEEE Computer Society, "Part 11: Wireless LAN Medium Access Control (MAC) and Physical Layer {PHY) Specifications", IEEE Std 802.11™—2012, Mar. 29, 2012, 212 pages.
IEEE Computer Society, "Part 11: Wireless LAN Medium Access Control (MAC) and Physical Layer (PHY) Specifications", IEEE P802.11ah Draft 0.1, May 2013, 330 pages.
Jin et al., "MAC Considerations for 802.11ah (Probe and Pull MAC)", IEEE 11-11/1512r0, Nov. 7, 2011, pp. 1-19.
Liu et al., "DCF Enhancements for Large Number of STAs", IEEE 802.11-11/1255r0, Sep. 15, 2011, pp. 1-11.
Park, Minyoung, "Proposed Specification Framework for TGah", IEEE 802.11-1/1137r6, Mar. 2012, pp. 1-13.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE P802.11ac/D4.1, Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D4.2 (Jan. 2013).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D4.0 (Apr. 2013).

* cited by examiner

| 902 | 904 | 906 | 908 | 910 | 912 | 914 | 916 | 918 | 920 |
|---|---|---|---|---|---|---|---|---|---|
| Element ID | Length | Option | Duration | Applicability | Provider | SSID | BSS Discovery Method | Active Scanning Frequency | Available BSS Info |

WI-FI CONTENTION REDUCTION

CROSS REFERENCE TO RELATED APPLICATION

This application is the National Stage Entry under 35 U.S.C. § 371 of Patent Cooperation Treaty Application No. PCT/US2014/064494, filed Nov. 7, 2014, which claims the benefit of U.S. Provisional Application No. 61/902,023 filed on Nov. 8, 2013, the contents of which are hereby incorporated by reference herein.

BACKGROUND

Wi-Fi devices, for example, Wi-Fi stations (STAs) may transmit probe requests to discover appropriate basic service sets (BSS') and/or BSS' associated with an extended service set (ESS). With the proliferation of Wi-Fi devices including, for example, personal access points, personal mobile devices, sensors, meters, etc., dense networks with a large number of Wi-Fi devices may be deployed. In such dense Wi-Fi networks the large number of devices may generate an excessive number of management frames, e.g., probe request frames and/or association request/response frames. Such excessive number of management frames may cause significant contention and interference among the devices, leading to severe degradation of QoS and throughput performance. A mechanism is desired to control a Wi-Fi device's transmission behavior, for example, to associate with an access point (AP).

SUMMARY

Systems, methods, and instrumentalities are disclosed that may reduce contention in a wireless network. Contention may be reduced by utilizing basic service set (BSS)—and/or extended service set (ESS)-based BSS discovery policies. For example, management frames, e.g., probe requests/responses and/or association/reassociation requests/responses may be limited or controlled in a wireless network.

An Institute of Electrical and Electronics Engineers (IEEE) 802.11 station (STA) may send a request frame (e.g., a first request frame) to an IEEE 802.11 access point (AP). For example, the request frame may be a probe request frame, an association frame, or a re-association request frame. The IEEE 802.11 AP may not be in a position to accommodate the IEEE 802.11 STA (e.g., the IEEE 802.11 AP may not allow the STA to associate with the IEEE 802.11 AP). For example, the IEEE 802.11 AP may belong to a provider that is different than the provider requested by the IEEE 802.11 STA, or the IEEE 802.11 AP does not have capacity to allow additional associations, etc. The STA may receive, from the IEEE 802.11 AP, a response frame. For example, the response frame may be a probe response frame, an association response frame, or a re-association response frame. The response frame may include BSS discovery policies. The BSS discovery policies may indicate a BSS discovery method that may be used by the requesting IEEE 802.11 STA. The BSS discovery policies may be valid for an indicated period of time. The indication may be explicit (e.g., discovery method allowed) or implicit (e.g., discovery method not prohibited). The BSS discovery method may include one or more of passive scanning only, fast initial link setup (FILS) scanning, or active and passive scanning. The period of time may be defined per channel or per SSID.

The response frame may include identification of one or more basic service sets (BSS') that may accommodate the IEEE 802.11 STA. The BSS discovery policy may be associated with one or more of a provider, a BSS, an extended service set (ESS), or an area.

The IEEE 802.11 STA may perform scanning of one or more channels based on the BSS discovery method. The IEEE 802.11 STA may send a second request frame, when the indicated BSS discovery method received from the IEEE 802.11 AP is active scanning. For example, the IEEE 802.11 AP may indicate to the IEEE 802.11 STA that active scanning is allowed after determining that an interference metric is met or not met, e.g., current interference is below a threshold, active scanning by the IEEE 802.11 STA will not cause interference to rise above a threshold, etc. The second request frame may be sent based on the BSS discovery policy received from the IEEE 802.11 AP. The IEEE 802.11 STA may send the second request frame during the period of time indicated in the BSS discovery policy. The IEEE 802.11 STA may send the second request frame, when time elapsed since last request exceeds an active scanning interval.

The IEEE 802.11 STA may use passive scanning when the BSS discovery method indicates passive scanning (e.g., prohibits active scanning). The IEEE 802.11 STA may refrain from sending a second request frame, e.g., when the BSS discovery method received from the IEEE 802.11 AP indicates passive scanning.

BRIEF DESCRIPTION OF THE DRAWINGS

FIG. 9 illustrates an example BSS discovery policy information element.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
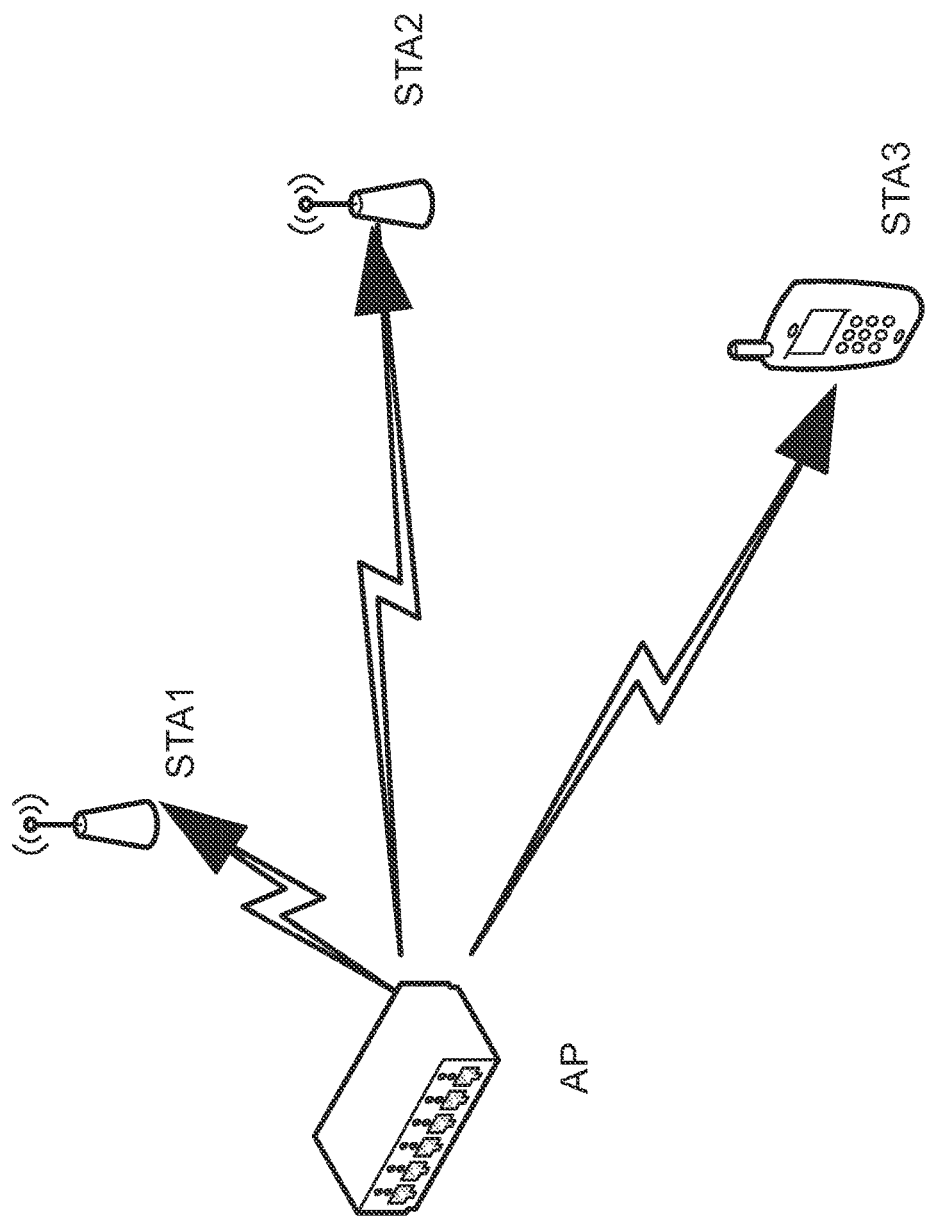
FIG. 1 illustrates an exemplary Wireless Local Area Network (WLAN) system.

A WLAN in infrastructure basic service set mode may have an access point (AP) for the basic service set (BSS) and one or more stations (STAs) associated with the AP as illustrated by example in FIG. 1. The AP may have access or interface to a Distribution System (DS) or another type of wired/wireless network that may carry traffic in and out of the BSS. Traffic to STAs may originate from outside the BSS, may arrive through the AP and may be delivered to the STAs. The traffic originating from STAs to destinations outside the BSS may be sent to the AP to be delivered to the respective destinations. Traffic between STAs within the BSS may be sent through the AP where the source STA may send traffic to the AP and the AP may deliver the traffic to the destination STA. The traffic between STAs within a BSS may be peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an Independent BSS (IBSS) mode may have no APs, and the STAs may communicate directly with each other. This mode of communication may be an ad-hoc mode.

Using the IEEE 802.11 infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The channel access in an IEEE 802.11 system may be Carrier Sense Multiple Access with Collision Avoidance (CSMA/CA). In this mode of operation, the STAs, including the AP, may sense the primary channel. If the channel is detected to be busy, the STA may back off. If the channel is detected to be free, the STA may acquire the channel and transmit data.

In IEEE 802.11n, High Throughput (HT) STAs may use a 40 MHz wide channel for communication. This may be achieved, for example, by combining the primary 20 MHz channel, with an adjacent 20 MHz channel to form a 40 MHz wide contiguous channel.

In IEEE 802.11ac, very high throughput (VHT) STAs may support, e.g., 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped onto the two channels, and the data may be transmitted. At the receiver, this mechanism may be reversed, and the combined data may be sent to the MAC.

IEEE 802.11af and IEEE 802.11ah may operate in the sub 1 GHz band. For these specifications the channel operating bandwidths may be reduced relative to those used in IEEE 802.11n, and IEEE 802.11ac. IEEE 802.11af may operate in the TV White Space (TVWS) spectrum, and IEEE 802.11ah may support 1 MHz, 2 MHz, 4 MHz, 8 MHz, and/or 16 MHz bandwidths, e.g., using non-TVWS spectrum.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

A spectrum (e.g., a new spectrum) may be allocated in various countries for wireless communication systems, such as WLANs. Channels allocated in the allocated spectrum may be limited, for example, in size and bandwidth. The spectrum may be fragmented, e.g., available channels may not be adjacent, and it may not be possible to combine them to support larger transmission bandwidths. This may be the case, for example, in spectrum allocated below 1 GHz in various countries. WLAN systems, for example, built on the 802.11 standard, may be designed to operate in this spectrum. Such WLAN systems may support smaller bandwidths and lower data rates compared to HT/VHT WLAN systems, for example, based on the 802.11n/802.11ac standards.

IEEE 802.11 based systems (e.g., with 802.11ah devices) in sub 1 GHz band may be provided. The IEEE 802.11ah devices may have an OFDM physical layer (PHY) operating below 1 GHz, e.g., in license-exempt bands excluding TVWS. MAC layer support may be provided to support such PHY layer. Such systems may co-exist with other systems (e.g., 802.15.4 and P802.15.4g), and may provide balancing of rate and range performance (e.g., outdoor range of up to 1 km and data rates greater than 100 Kbit/s). Use cases of such systems may include sensors and meters, backhaul sensor and meter data, and/or extended range Wi-Fi for cellular offloading.

Spectrum allocation in some countries may be limited. For example, in China, the 470-566 and 614-787 MHz bands allow 1 MHz bandwidth. A 1 MHz-only option may be supported, in addition to a 2 MHz mode. The 802.11ah PHY may support 1, 2, 4, 8, and 16 MHz bandwidths.

The IEEE 802.11ah PHY may operate below 1 GHz and is based on the 802.11ac PHY. To accommodate the narrow bandwidths used by IEEE 802.11ah, the IEEE 802.11ac PHY may be downclocked by a factor of 10. Support for 2, 4, 8, and 16 MHz bandwidths may be achieved by $\frac{1}{10}$ downclocking. Support for the 1 MHz bandwidth may use a PHY definition with an FFT size of 32.

IEEE 802.11 High-Efficiency WLAN (HEW) may enhance the Quality of Experience (QoE) for a broad spectrum of wireless users in many usage scenarios, including high-density scenarios in the 2.4 GHz and 5 GHz band. Some use cases may support dense deployments of APs, and STAs.

An access points (AP) or a station (STA) referred to herein may refer to an IEEE 802.11 AP or an IEEE 802.11 station respectively. HEW may be used in applications involving a high density of APs and a large number of stations per AP. HEW may be used in indoor applications involving a high density of stations. HEW may be used in indoor applications involving a high density of APs (e.g., with a low or medium density of stations per AP) or in outdoor applications involving a high density of APs (e.g., with a high density of stations per AP). HEW may be used in throughput-demanding applications. Technologies that support a large number of devices may be involved in one or more of these applications. Reduction of contention may provide high efficiency for HEW systems.

Figure 2:
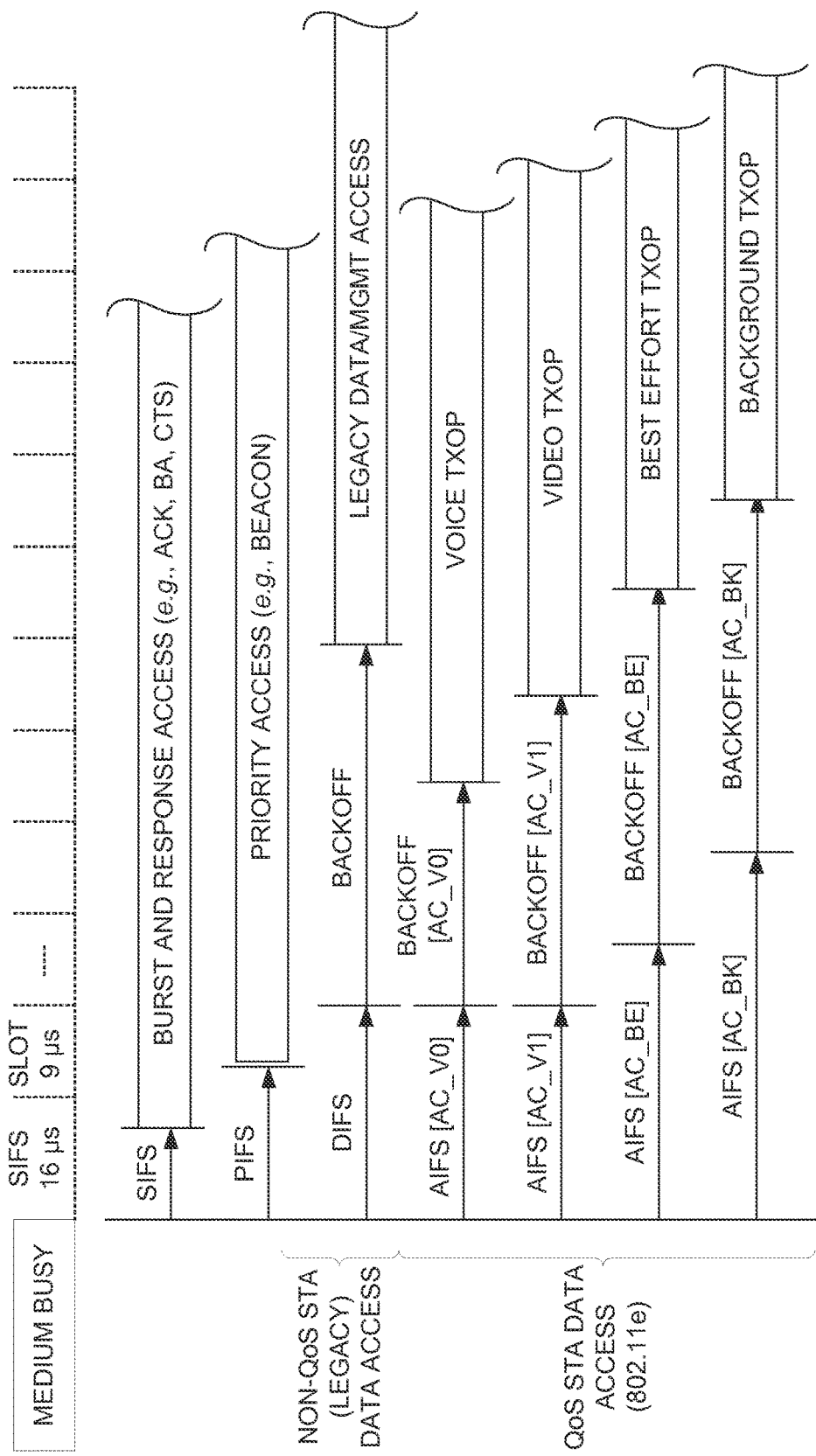
FIG. 2 illustrates an example of enhanced distributed channel access (EDCA) operation.

Enhanced distributed channel access (EDCA) may be an extension of the distributed coordination function (DCF) introduced in the 802.11 standard to support prioritized quality of service (QoS). FIG. 2 illustrates the operation of EDCA, for example, as provided in IEEE 802.11n standard.

A point coordination function (PCF) may use contention-free channel access. PCF may support time-bounded services and polling by an AP. As illustrated in FIG. 2, an AP may send a polling message after waiting for PIFS. If a client has nothing to transmit, the client may return a null data frame. Because PIFS is smaller than DIFS, it may lock out all the asynchronous traffic. PCF may be deterministic and fair, and may be efficient for both low duty-cycle and heavy or bursty traffic.

Hybrid coordination function controlled channel access (HCCA) may be an enhancement of PCF. In HCCA, an AP may poll a station during both contention periods (CPs) and contention-free periods (CFPs). Multiple frames may be transmitted under one poll.

Figure 3:
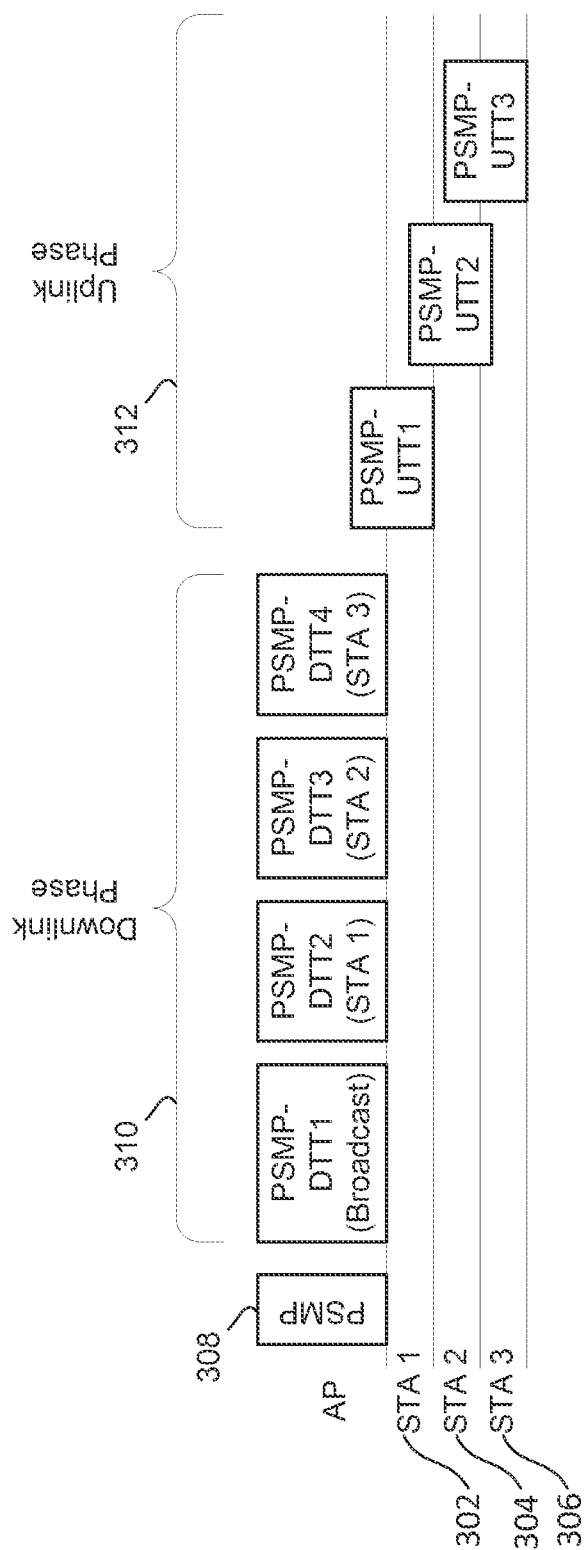
FIG. 3 illustrates an example of power-save multi-poll (PSMP) operation.

FIG. 3 illustrates an example of power-save multi-poll (PSMP) operation of one or more stations (e.g., three stations STA1 302, STA2 304, and STA3 306). PSMP may use a single PSMP frame 308 to schedule multiple stations, instead of the direct QoS (+) CF-poll used in HCCA. PSMP may perform more efficiently under the scenario in which stations may transmit small amounts of data periodically. Power consumption may be reduced by providing uplink (UL) schedule for uplink phase 312 and downlink (DL) schedule for downlink phase 310 at the start of the PSMP phase. A station may shut down its receiver until it is used in the DL phase 310. A station may transmit when scheduled during the UL phase 312 without performing CCA.

Restricted channel access control may manage access to the wireless medium (WM) to avoid simultaneous transmissions from a large number of stations that may be hidden from each other and may enable fair channel access among the stations. For example, a traffic indication map (TIM) element may cover a few hundred to a few thousand stations with their TIM bits set to one. This may trigger many simultaneous PS-Poll/trigger frame transmissions from the stations, e.g., after the beacon reception. Restricting uplink channel access to a small number of stations and spreading their uplink access attempts over a much longer period of time may improve the efficiency of the utilization of the medium by reducing collisions. An AP may allocate a medium access interval RAW (restricted access window) for a group of stations within a beacon interval, e.g., when dot11RAWOptionActivated is true. Stations in the group may be allowed to access the WM in the RAW. Assigning restricted uplink channel access windows to different groups of stations may increase fairness. An AP may assign periodic RAW for a group of stations to reduce scheduling overhead for scheduling RAW.

Target Wake Times (TWTs) may allow an AP to manage the activity in the BSS to reduce or minimize contention and to reduce the amount of time that a station utilizing a power management mode may be awake to exchange frames with other stations. The assignment of specific times for a participating station (e.g., TWT STA) to wake to access the medium may facilitate TWT. TWT STAs may communicate their wake requirements to APs, and APs may devise a schedule and deliver TWT values to stations. During a TWT, the AP may send information about the next TWT to each participating TWT STA. A TWT STA may receive the next TWT information, e.g., when a TWT STA wakes and performs a frame exchange, and if explicit TWT is being used. The TWT STA may calculate each next TWT in an implicit series of TWT values. Individual stations may not be made aware of the TWT values of other stations. There may not be restrictions on the assignment of TWT values to stations. APs may protect TWT times with protection mechanisms including, e.g., NAV-setting frame exchanges and RAW scheduling.

Figure 4:
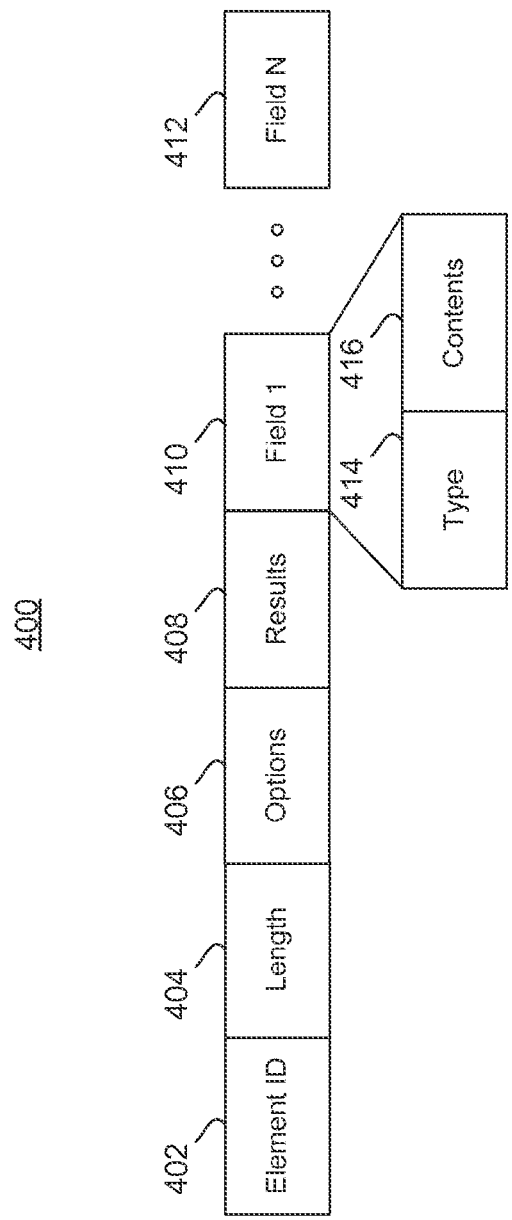
FIG. 4 illustrates an example coordination request information element.
Figure 5:
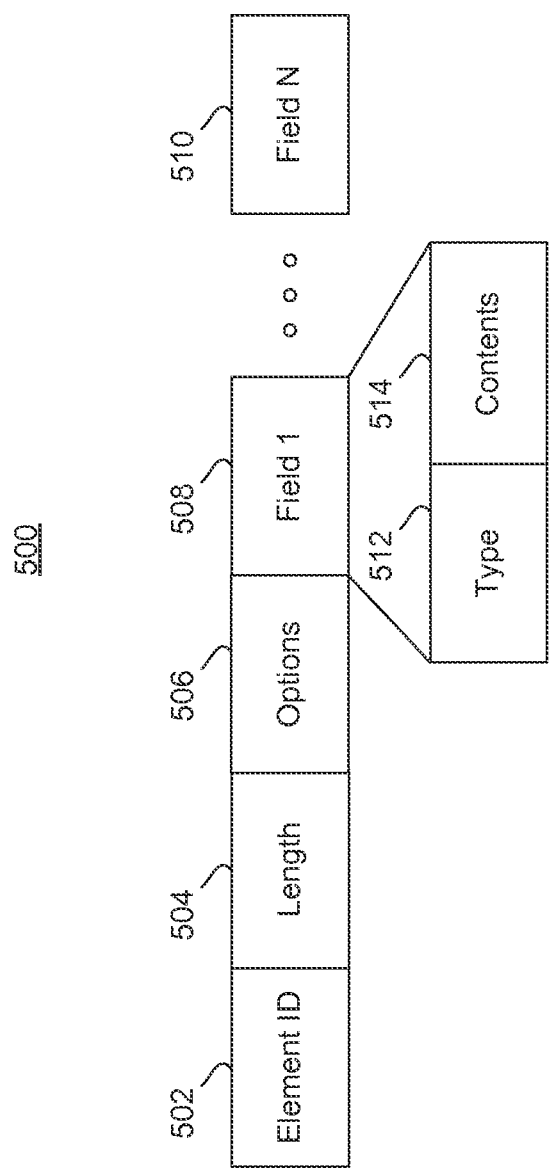
FIG. 5 illustrates an example coordination response information element.

Inter-AP coordination may be used to coordinate a variety of parameters and settings for OBSS, including, for example, QoS load and settings, primary and coordination channels, TXOP, and/or UL access and TIM indications. FIG. 4 illustrates an example Coordination Request information element (IE) 400. Coordination Request IE 400 may comprise an Element ID field 402, a Length field 404, Options field 406, Results 408, Fields (e.g., Field 1 field 410 to Field n field 412). Each of the Field fields may comprise a Type subfield 414 and/or a Contents subfield 416). FIG. 4 illustrates an example Coordination Response information element (IE) 500. Coordination Response IE 500 may comprise an Element ID field 502, a Length field 504, an Options field 506, and one or more Fields (e.g., Field 1 field 508 to Field n field 510). Each of the Field fields may comprise a Type subfield 512 and/or a Contents subfield 514). Interference and neighboring BSS reporting may be used as part of inter-BSS coordination.

Figure 6:
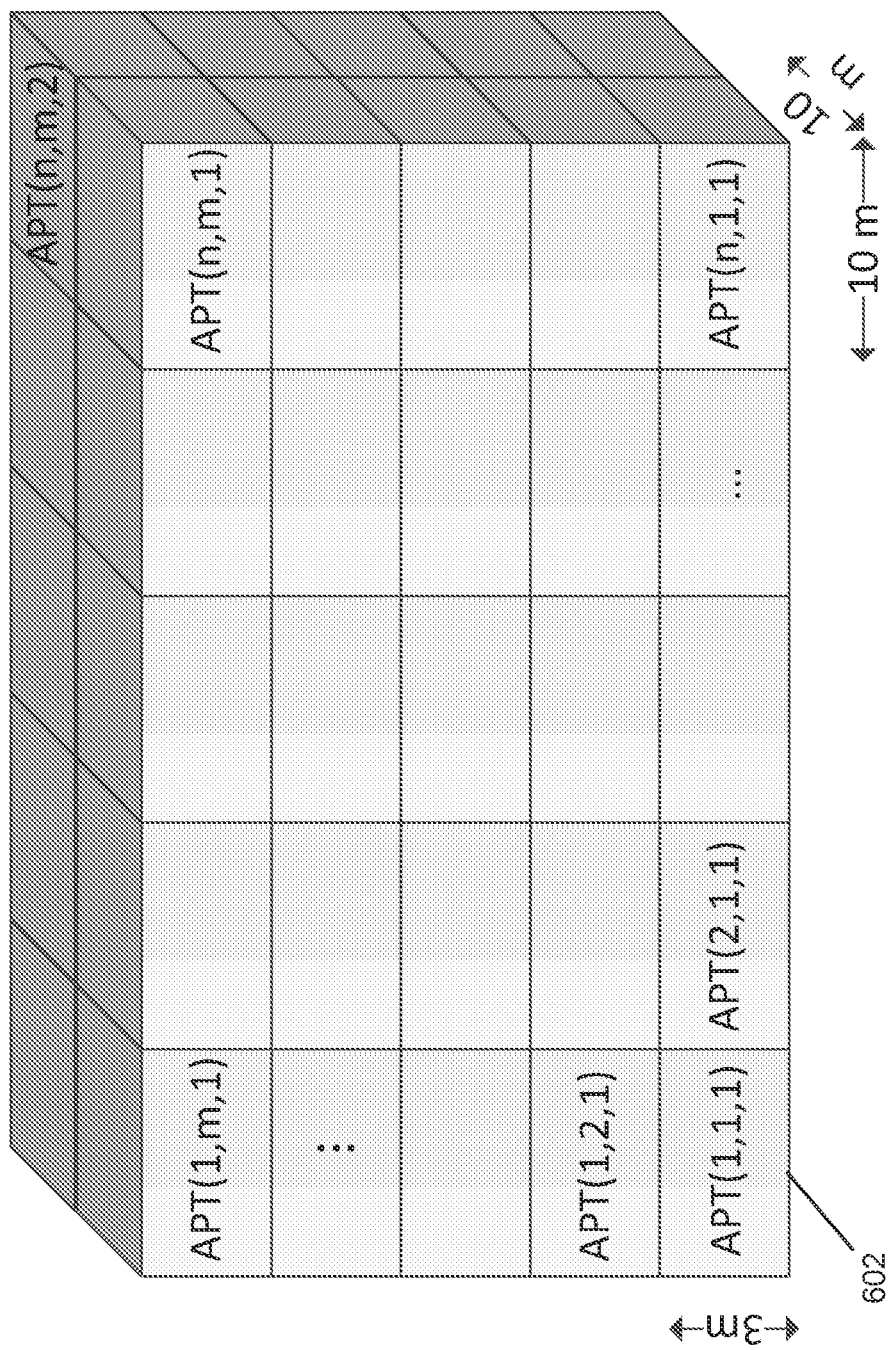
FIG. 6 illustrates an example collection of densely deployed basic service sets (BSSs) in a residential apartment building.
Figure 7:
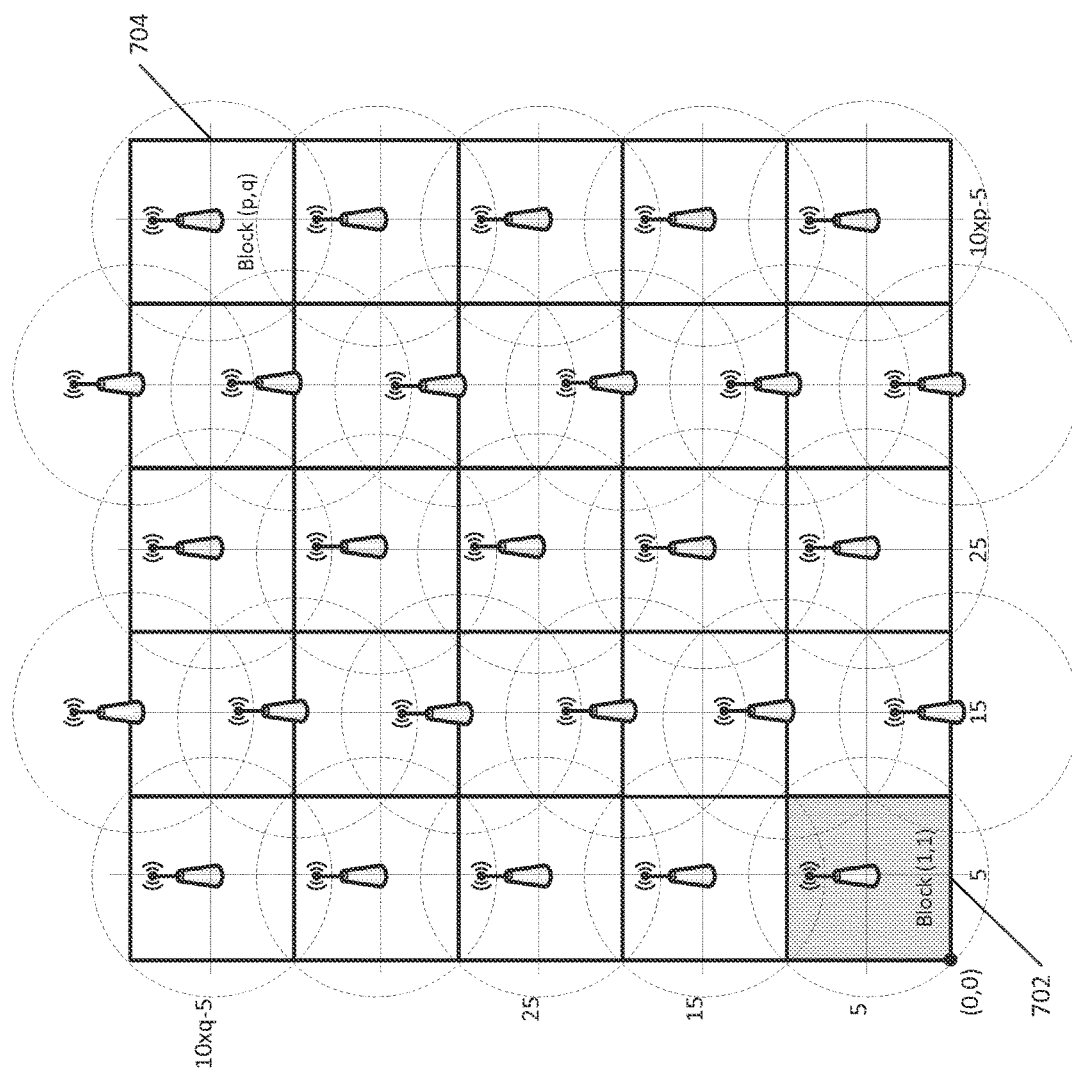
FIG. 7 illustrates another example collection of densely deployed BSSs.

FIG. 6 illustrates an example of BSSs in an apartment building. As illustrated in FIG. 6, BSSs on the edge of a collection of network of densely deployed BSSs may experience significantly less interference than BSSs located more centrally in the network. FIG. 7 illustrates an example of a stadium scenario with p×q blocks from block (1, 1) 702 to block (p, q) 704. Each of the blocks may represent a deployed network.

In densely deployed networks, for example, as illustrated in FIG. 6 and FIG. 7, the STAs located in the edge BSSs may have higher performance because they may experience less interference than stations located in BSSs that are located more at the center of the deployed networks. The increased performance in the edge BSSs may impact the performance in the more central BSSs due to increased interference and higher medium occupation time. This may cause disparity in the performance of the different BSSs; this may be referred to as the exposed BSS effect. Inter-AP/inter-BSS coordination may be used to provide good and homogenous performance in each of the BSSs in the deployed networks, e.g., as a mitigation of the exposed BSS effect.

Dense networks may be deployed in areas where a large number of STAs may be present, such as stadiums, busy streets, and crowded indoor and outdoor venues. Stations in these areas may transmit probe request frames to discover the appropriate BSS for association or re-association for the following reasons. For example, the STAs may have just arrived in the network area. The STAs may transmit probe request to discover a new BSS because they may desire to disassociate or have disassociated from their current BSS due to mobility, changed channel conditions, etc. The STAs may transmit probe request to discover appropriate BSS' because the STAs may not be allowed to associate with a discovered BSS due to admission control policies. For example, the discovered BSS may have already admitted the maximum allowed number of STAs. Excessive probe request frames and the associated response frames may cause significant contention and interference for ongoing regular traffic, which may lead to degradation of QoS and throughput performance of each of the STAs located in the vicinity. This may be counterproductive for any AP-based QoS control and throughput enhancement mechanism that targets STAs associated with these APs. A mechanism may be used to control stations' transmission behavior before they are associated with an AP.

The exposed BSS effect may be addressed (e.g., mitigated) using resource utilization coordination. An AP may indicate that it is capable of resource utilization coordination by including a resource utilization coordination information element in its beacon, short beacon, action frames, action frames without ACK, or in any control, management, Null Data Packet (NDP) or extension frames or frames on a different interface, such as Ethernet or IP frames.

Figure 8:
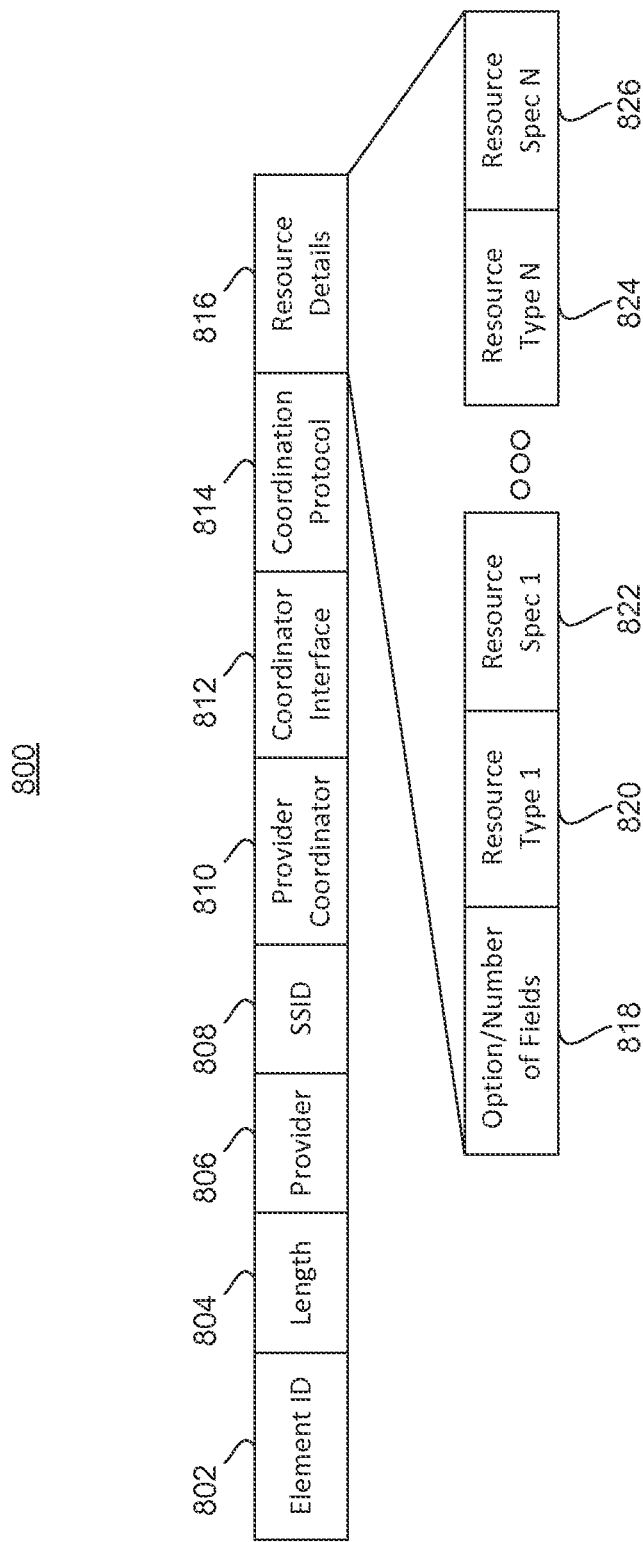
FIG. 8 illustrates an example resource utilization coordination information element.

FIG. 8 illustrates an example resource utilization coordination information element (IE) 800. The Resource Utilization Coordination IE may comprise an element ID field 802, a length field 804, a provider field 806, an SSID field 808, a provider coordinator field 810, a coordinator interface field 812, a coordination protocol field 814, and/or a resource details field 816.

The element ID 802 may identify that the information element 800 is a Resource Utilization Coordination element. The length field 804 may indicate the length of the information element 800.

The provider field 806 may indicate the provider of the transmitting AP/BSS. A provider may be a cellular service provider, a WLAN service provider or any other type of provider that offers WLAN services to stations. A routing area, or finer identifications of a subset of the provider's coverage area to which the transmitting AP/BSS may belong, may be identified. The SSID field 808 may indicate the SSID to which the transmitting AP/BSS belongs.

The provider coordinator field 810 may identify the coordinator that belongs to the appropriate provider and may conduct coordination for the transmitting AP/BSS. A provider coordinator may be, for example, an AP or an eNodeB. This field may be implemented, for example, as an IP address, a MAC address, or any other type of identifier that may be predefined. A provider coordinator bit may indicate whether the transmitting AP/device(s) is the provider coordinator. A coordinator bit may indicate whether the transmitting AP/device(s) is the coordinator, which may conduct coordination. A provider coordinator or coordinator bit may be present in another element, such as an HEW/VHSE operation element, an HEW/VHSE capability element, etc.

The coordinator interface field 812 may indicate the interface used by the provider coordinator. The coordinator interface field 812 may have values of, for example, IP, Ethernet, WLAN, etc. The coordination protocol field 814 may indicate the coordination protocol used by the provider coordinator for coordination activities.

The resource details field 816 may indicate one or more details of resources that the transmitting AP may be capable of coordinating. The resource details field 816 may include an option/number of fields 818, one or more resource type fields 820, and/or one or more resource spec fields 822.

An option/number of fields 818 may indicate how many fields are included in the resource details field 816. The option/number of fields 818 may indicate the type of resources included in the other subfields of the resource details field 816, such as, for example, time, frequency, subcarriers, QoS settings, sectors, etc. The option/number of fields 818 may be implemented using a bitmap with each positive indication in the bitmap indicating the inclusion of a particular type of resources predefined. The resource spec fields 822 may be included following the option/number of fields 818. They may be in the order of the resource types as indicated in the option/number of fields 818.

The resource type fields 820 may indicate the types of resources the transmitting AP/device may be able to coordinate, e.g., if they are not indicated in the option/number of fields field 818. The values of the resource type fields 820 may include, for example, time, frequency, subcarriers, QoS settings, sectors, etc.

The resource spec fields 822 may include details on the resources. For example, a resource spec field i may include the details on the resources of the type indicated in either the resource type i or in the option/number of fields field 818. The described resources may be of those in use by the transmitting AP/BSS or of those proposed to be used, or assigned by the provider coordinator. The specifications for resources may include one or more parameters, including, for example, time, frequency, subcarriers, QoS settings, etc.

Using the resource details field 816 and/or the resource spec fields 822, one or more resources may be specified for one or more BSSs. For example, the resource details field 816 and/or the resource spec fields 822 may specify time intervals, frequency resources, QoS settings, and the like.

Time intervals, such as RAW or another type of beacon interval and subintervals may be specified for one BSS, or for several OBSS to share. The time interval may be specified as, for example, starting time, duration, repeat frequency, or shared/exclusive. When the time interval is assigned as exclusive, usage of the interval may be limited to the assigned BSS, e.g., other OBSSs may not be allowed to use it. When the time interval is assigned as shared, it may be shared by several OBSSs.

One or more channels may be assigned or utilized by a BSS. BSSs located in high interference regions may be allocated one or more frequency channels that are not used by their OBSSs. BSSs located in high interference regions may be assigned more frequency channels than those located at low interference regions. BSSs located in high interference regions may be assigned one or more frequency channels that may have less frequency reuse rate in their OBSSs.

A set of frequency subcarriers may be assigned to or utilized by a BSS. BSSs located in high interference regions may be allocated one or more sets of frequency subcarriers that are not used by their OBSSs. BSSs located in high interference regions may be assigned more frequency subcarriers than those located at low interference regions. BSSs located in high interference regions may be assigned one or more frequency subcarriers that may have less frequency reuse rate in their OBSSs.

Specifications for resources may also specify QoS settings. For example, BSSs located in high interference regions may be assigned higher priority medium access parameters, such as smaller Contention Window size and/or smaller AIFS numbers, for one or more ACs, than those located in lower interference regions.

A subset of the fields or subfields of the Resource Utilization Coordination information element 800 may be implemented as a field, or a subfield or subsets of fields or subfields of any information element or as a part of an action frame, an action without ACK frame, a control frame, a management frame, an extension frame or a NDP frame, or MAC/PLCP headers, as well as an Ethernet frame, an IP packet, etc.

An AP that is capable of resource utilization coordination may include the resource utilization coordination element in its beacon, short beacon, action frames, action frames without ACK or any other type of frame, such as control, management or extension frames, or other types of frames, such as IP or Ethernet packets.

APs may conduct resource utilization coordination either directly with other APs or through a provider coordinator and/or a coordinator. Resource utilization coordination may be used to mitigate the exposed BSS effect, since BSSs located in the center of a dense deployed networks (e.g., the networks shown in FIGS. 6 and 7) may experience higher interference and their performance may be reduced compared to BSSs on the edge of the deployed networks. The resource utilization coordination may be conducted using the Coordination Request and Coordination Response information elements (IEs).

A provider may assign a provider coordinator to conduct coordination among its APs or BSSs in an area. The provider coordinator may be, for example, an AP or an eNodeB or another type of device. An AP may be elected or selected in a distributed manner to be the provider coordinator. A coordinator may be assigned or selected as an area coordinator that may conduct coordination for BSSs and ESSs (e.g., all BSSs and ESSs) and/or providers in an overlapping area. A provider coordinator may collect information from APs of the same provider from its area, such as interference, performance, information on BSSs from the same coverage area that may belong to the same and/or other providers, etc. This may leverage interference reporting.

A provider coordinator may request coordination with other provider coordinators of overlapping networks deployed by other providers, e.g., using a frame including the Coordination Request IE. The Coordination Request IE may include an options field and/or other fields.

The options field may indicate options for the coordination and may comprise one or more of a sequence number, a type of request, a number of fields included in the coordination request, and/or types of parameters included in the Coordination Request IE. The sequence number may identify the coordination request. The type of request may be, for example, a request for information (e.g., requesting settings and parameters from the destination provider coordinator) or a Request of Coordination with or without a list of proposed settings. The types of parameters included in the Coordination Request IE may have values such as those included in the Resource Utilization Coordination IE, etc.

The Coordination Request IE may include other fields that may comprise one or more types of parameters that may be subject to coordination and may include information such a type subfield indicating a type of parameters specified in the field, e.g., time, frequency, subcarriers, QoS settings, sector, etc. A contents subfield may specify the parameter indicated by the type subfield and may be similar to the resource spec subfield 822 of the Resource Utilization Coordination IE 800.

Figure 11:
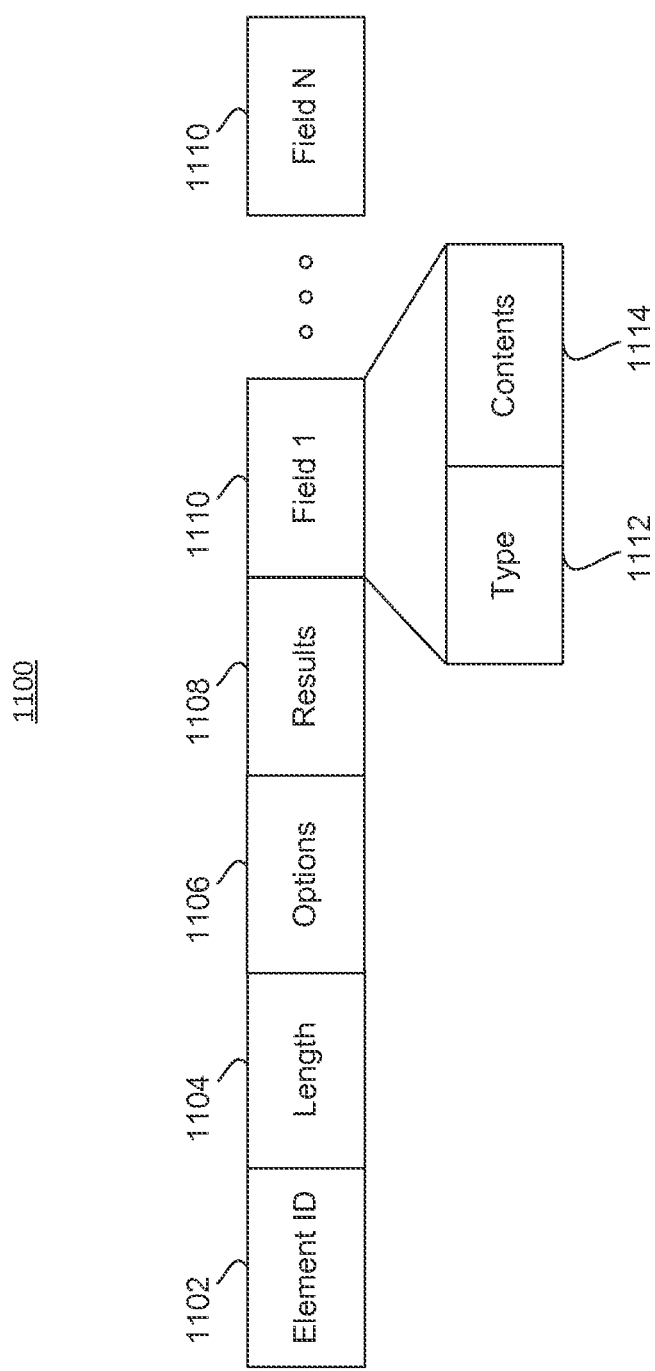
FIG. 11 illustrates an example coordination response information element.

When requested by another provider coordinator, a provider coordinator may respond with a frame including a Coordination Response information element (IE) 1100 shown in FIG. 11, which may include a results field that indicates a status of the coordination request and may have a value of Success or Reject. The results field may have alternative values. The results field indicating that information on current settings and/or parameters as requested may be provided in the Coordination Response information element (IE) 1100. The results field may have a value of a sequence number, which may be the same as that included in the Coordination Request IE.

The Coordination Response IE 1100 may include a type subfield that may indicate that the contents subfield 1114 may include alternative values for resource utilization, which may be different from the original values indicated in the Coordination Request IE. The type subfield may indicate that the contents subfield may include current values of resource utilization at the responding provider coordinator, which may be requested by the requesting provider coordinator as indicated in the Coordination Request IE.

The Coordination Request/Response IE or any subset of the fields or subfields thereof may be implemented as a field or subfield or subsets of fields or subfields of any IE, or as a part of any control, management, extension, NDP or other type of frames or in MAC/PLCP headers.

A provider coordinator may request information from other provider coordinators, e.g., from the same or overlapping coverage areas. The provider coordinator may request coordination on settings and parameters using proposed settings and parameters. When receiving a coordination request, a provider coordinator may provide information related to its own settings and parameters, e.g., if requested. The provider coordinator may conduct coordination, e.g., if it is requested to do so. The provider coordinator may evaluate whether the parameters and settings are acceptable. If the settings and parameters are acceptable, the responding provider coordinator may respond with a result code Success. Otherwise, the responding provider coordinator may reject the settings and parameters.

A provider coordinator may provide alternative settings that may be acceptable to the responding provider coordinator. A requesting provider coordinator may start using new settings and parameters when provider coordinators (e.g., all provider coordinators) have accepted its request. Once the new setting is accepted, the provider coordinator may configure its APs in the coverage area using the new parameters and settings.

For example, a provider coordinator, triggered by requests from the APs in its coverage area, or autonomously or periodically, may evaluate the performance of the BSSs in its coverage area. The provider coordinator may coordinate with the provider coordinators (e.g., all of the provider coordinators) in the overlapping coverage area for resource utilization coordination. For example, a BSS located in a high interference area (e.g., the center of a densely deployed Wi-Fi OBSS or a BSS that partially overlaps or is adjacent to one or more heavily loaded BSSs) may be assigned a longer time interval for medium access, or more and/or longer exclusive time intervals than that the BSSs in the OBSSs are not allowed to use, or shared time intervals that only a limited number of OBSSs may use. A BSS located in a high interference area may be assigned more frequency resources, such as frequency channels or subcarriers, compared to those located in a lower interference area, such as at the edge of the Wi-Fi network. A BSS located in a high interference area may be assigned higher priority medium access parameters such as smaller contention window size, smaller initial contention window size, and/or smaller AIFS values for one or more access categories or for one or more of its stations. A BSS located in a low interference area (e.g., the edge of the stadium Wi-Fi network) may be assigned lower priority medium access parameters, such as higher contention window size, higher initial contention window size, and/or larger AIFS values for one or more access categories or for one or more of its stations.

An AP may conduct resource utilization coordination with its neighboring APs directly using a procedure that is similar to the one used by provider coordinators described herein.

An AP may conduct resource utilization coordination with its neighboring APs through a coordinator or an area coordinator that may or may not belong to a provider using a procedure that is similar to the one used by provider coordinators described herein.

Resource utilization coordination may be based on interference and results reports. Resource utilization coordination may achieve better performance for BSSs with high load and high interference.

Contention may be reduced by limiting probe request frequencies. For example, excessive probe request frames may be limited or controlled by providing BSS- or ESS-based BSS discovery policies. BSS discovery policies may be coordinated among BSSs in an overlapping area, e.g., between different providers or within the same ESS or BSSs of the same provider. Contention may be reduced, e.g., if the BSS discovery policies require that probing stations use passive scanning or FILS scanning (e.g., passive scanning only or FILS scanning only) as the BSS discovery method, or that probe stations can only send out probe request frames with some minimum time separations between probe request frames.

FIG. 9 illustrates an example of a BSS discovery policy element. A station or an AP may indicate BSS discovery policies using a BSS discovery policy information element (IE) 900, as illustrated in FIG. 9. The BSS discovery policy IE 900 may include one or more of an element ID 902, a length field 904, an option field 906, a duration field 908, an applicability field 910, a provider field 912, an SSID field 914, a BSS discovery method field 916, an active scanning frequency field 918, or an available BSS information field 920. The element ID 902 may indicate that the IE 900 is a BSS discovery policy IE. The length field 904 may indicate the length of the BSS Discovery Policy IE 900. The option field 906 may specify the fields that may be included in the BSS Discovery Policy IE 900. For example, the option field 906 may specify whether an available BSS information field 920 may be included or only an available BSS information field 920 may be included, and/or whether an active scanning frequency field 918 is included, etc.

The duration field 908 may indicate the duration for which the BSS discovery policy specified by the BSS Discovery Policy IE 900 may be valid. The duration field may include a starting time specifying the starting time of the valid period of the BSS discovery policy.

The applicability field 910 may indicate the applicability of stations. For example, the applicable stations may be stations that are associated with a particular provider or SSID, or a class of subscribers to a provider, such as basic, plus, or platinum users for a cellular provider or Wi-Fi network provider, or sensors and meters, or cellular offloading devices. The BSS discovery policy may be applicable to each of the stations or to one or more types of stations, such as sensors and meters, cellular offload devices, gaming devices, etc.

The provider field 912 may specify the provider or providers for which the BSS discovery policy may be valid. For example, the provider may be a cellular network provider, a Wi-Fi network provider, or other type of providers or consortium that may provide Wi-Fi or other access to network services. The provider may be specified using a provider code or in a format, such as an ASCII format. If the BSS discovery policy is applicable to a class of subscribers of the provider rather than to each of the subscribers of the provider, the class or classes of subscribers, such as basic, plus, and/or platinum subscribers, may be specified in this or a separate field.

The SSID field 914 may specify the SSID or SSIDs for which the BSS discovery policy may be valid. The SSID field 914 may be set to a wildcard SSID, e.g., if the BSS discovery policy is valid for each of the ESSs or BSSs in the area. The SSID field 914 may comprise one or more subfields, e.g., if the BSS discovery policy is valid for one or more, but fewer than all ESSs or BSSs. A subfield may specify an SSID for an ESS or a BSS for which the BSS discovery policy is valid.

The BSS discovery method field 916 may specify the BSS discovery method that may be used by the applicable stations. The field may indicate a value including one or more of passive scanning only, FILS scanning, or active and passive scanning.

The active scanning frequency field 918 may be defined on a per channel basis, on a per SSID basis, and/or for the entire band. The active scanning frequency may be the frequency at which a probing station may send out probe request frames. The minimum active scanning interval (e.g., per channel, per band, and/or per SSID) may be defined as the reciprocal of the active scanning frequency. The frequency band, channel/resource block in which a probing STA may be conduct BSS discovery may be provided in this or a separate field. For example, one or more BSS Discovery Policy elements may be provided in a frame. Each of the elements may specify BSS Discovery Policy for a particular band, frequency channels, or a set of resource blocks.

The available BSS information field 920 may include one or more subfields. This field, or a subfield of this field, may provide information on BSSs that may satisfy a request from a station. For example, when a station sends an association request to an AP, and the AP may not be able to accommodate the probing station, the AP may determine whether another BSS in the same or a different ESS may be able to support the probing station based on criteria that may be included in the association request or probe request. The available BSS information field 920 or a subfield of the available BSS information field 920 may include the following information on the available BSSs, such as, for example, BSSID, SSID, provider, class of subscribers, number of open slots for stations, operating channels, etc.

A subset of the fields and subfields of the BSS Discovery Policy IE 900 may be implemented as a field or subfield or subsets of fields or subfields of an IE, or as a part of an action frame, an action without ACK frame, a control frame, a management frame, an extension frame, an NDP frame or an MAC/PLCP headers.

BSS discovery procedures may be provided. An AP may announce a BSS discovery policy, e.g., by including the BSS Discovery Policy IE 900 in its beacon, short beacon, measurement pilot, probe response, association or reassociation response or a control frame, a management frame, or an extension frame or an NDP frame.

A STA may send one or more of a probe request, an association request, or a reassociation request to an AP. The probe request, the association request, or reassociation request may be addressed to the AP's BSSID or SSID. The STA may send a broadcast wildcard probe request that may include the AP's BSSID or SSID. The STA may send an indication of a provider that the AP may support. The AP may evaluate whether it may support the probing STA. If the probing STA can be supported, the AP and the STA may proceed with probing and association. If the AP cannot accommodate probing station, the AP may respond with either a probe response or an association or reassociation response frame (e.g., depending on the frame to which the AP is responding). The response frame may include the BSS Discovery Policy IE 900 to inform the probing STA of the BSS Discovery policy of one or more of a provider, a BSS, an ESS, or an area.

In an area, one or more APs may belong to the same ESS. The APs in the ESS may have the same SSID and/or may support the same provider or different providers. One of the APs in the ESS may be assigned or elected or selected as the responder AP. The responder AP may be selected by a controller (e.g., a centralized controller) or in a distributed manner. The responder AP may be responsible for responding to wildcard probe requests with a probe response frame. The probe frame may include the local/ESS/area BSS Discovery Policy IE. The response may include an indication of one or more SSIDs, providers, etc. The responder AP may be responsible for responding to probe requests addressed to one or more SSIDs or BSSIDs with a probe response frame including the local, ESS, or area BSS Discovery Policy IE. The responder AP may include information on available BSSs that may accommodate the probing station, e.g., if the responder AP has that information. An AP that is not a responder AP and that may not be able to accommodate the probing station may ignore the probe requests received, unless the received probe request is addressed to its BSSID. An AP that is not a responder AP but can accommodate the probing station may respond with a probe response.

If an AP has received a probe request or association or reassociation request that is addressed to its BSSID, the AP may continue probing and association if the AP can accommodate the probing STA. If the probing STA cannot be accommodated, the AP may reject the association or reassociation request by responding with a probe response or association or reassociation response frame that may include the BSS Discovery Policy IE to inform the probing station of the local/BSS/ESS/areal BSS Discovery policy. The AP may include in the BSS Discovery Policy IE information about available BSSs that may accommodate the probing STA, e.g., if the AP has that information.

After receiving a management frame (for example, the association response frame that rejects an association request) with the BSS Discovery Policy IE 900, the STA may apply the BSS scanning policy obtained in the BSS Discovery Policy IE in the duration specified by the BSS Discovery Policy IE, e.g., by the duration field 908. The received BSS scanning policy may be enforced, for example, using a field or IE in an MLME-SCAN.request primitive.

If one or more BSS Discovery Policy IEs are received with each IE specifying BSS discovery policy for a particular frequency band, frequency channel or a set of resource blocks, the MLME-SCAN.request may include the parameters, such as ScanType, Active Scanning Frequency, etc., for the appropriate frequency band, frequency channel or set of resource blocks.

Upon receipt of the MLME-SCAN.request primitive with a ScanType field indicating an active scan, a STA may, for each of the channels to be scanned, perform scanning according to the discovery method specified in the BSS discovery method field 916 in the received BSS Discovery Policy IE 900. In case of active scanning BSS discovery method, FILS scanning or active scanning may be allowed. Depending on the applied type of type of scanning, the scanning procedures may be different. The example scanning disclosed herein assumes that conventional active scanning is applied.

If an active scanning frequency or a minimum active scanning interval is defined per channel, a STA may wait until the ProbeDelay time has expired and the time eplased since its last Probe Request frame sent on this channel has exceeded the minimum active scanning interval, or a PHY-RxStart.indication primitive has been received and the time eplased since its last Probe Request frame sent on this channel has exceeded the minimum active scanning interval. The STA may perform Basic Access procedure, for example, as provided in IEEE 802.11 specifications. The STA may send a probe request to the broadcast destination address, with the SSID and BSSID from the MLME-SCAN.request primitive. When the SSID List is present in the MLME-SCAN.request primitive, send one or more Probe Request frames, each with an SSID indicated in the SSID List and the BSSID from the MLME-SCAN.request primitive. If an active scanning frequency or a minimum active scanning interval is defined per SSID, a Probe Request frame for the SSID may be sent, e.g., if the time eplased since its last Probe Request frame sent to this SSID has exceeded the minimum active scanning interval.

The STA may set a ProbeTimer to 0, or an appropriate initial value, and start the ProbeTimer. If PHY-CCA.indication (busy) primitive is detected before the ProbeTimer reaches MinChannelTime, then the STA may set NAV to 0 and scan the next available channel, else when ProbeTimer reaches MaxChannelTime, the STA may process each of the received probe responses.

The STA may set NAV to 0 and scan the next available channel. The active scanning procedure can be further optimized by re-ordering the channels to be scanned in the descending order of time elapsed since its last Probe Request frame sent on this channel.

Inter-BSS and/or inter-ESS discovery policy coordination procedures may be provided. One or more APs in an ESS or in different ESSs over an overlapping area may conduct coordination on BSS discovery policies. A Coordination Request IE and/or a Coordination Response IE may be leveraged for coordination in BSS discovery policy.

A provider may assign a provider coordinator to conduct coordination among its APs in an area. An AP may be elected or selected in a distributed manner to be the provider coordinator. A coordinator may be assigned or selected as an area coordinator, which may conduct coordination for BSSs and ESSs (e.g., all BSSs and ESSs) and/or providers in an overlapping area. A provider coordinator may collect information from APs of the same provider from its area, such as interference, performance, and/or information on BSSs from the same coverage area that may belong to the same or other providers. This may leverage interference reporting methods.

Figure 10:
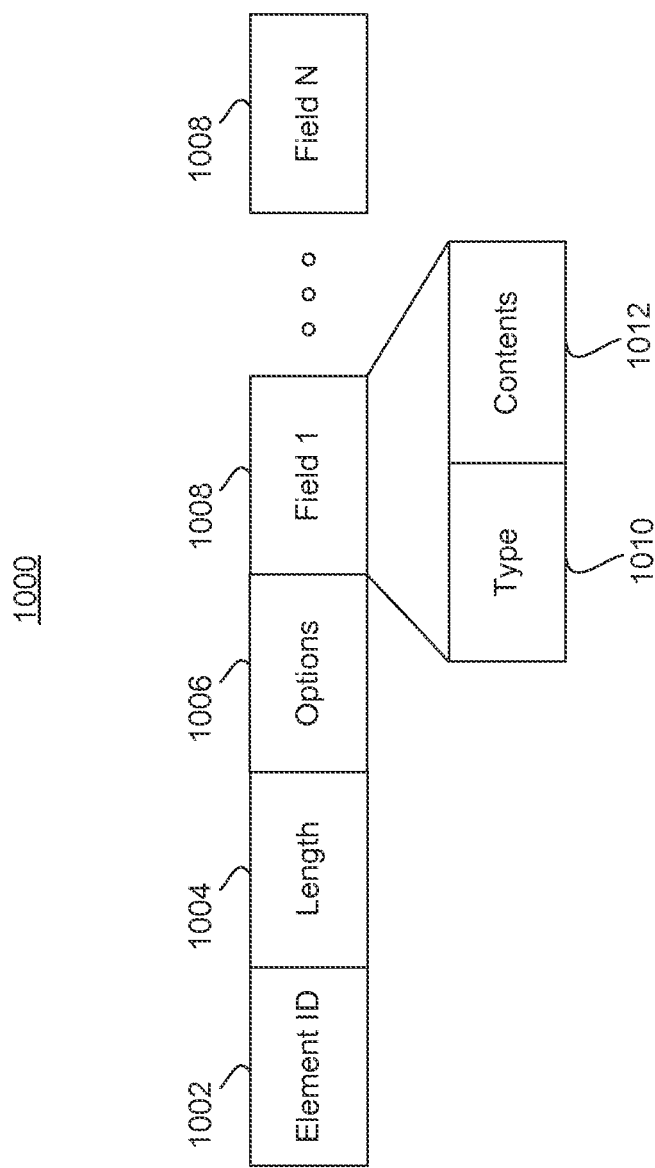
FIG. 10 illustrates an example coordination request information element.

FIG. 10 illustrates an example of a Coordination Request IE 1000. A provider coordinator may request coordination with other provider coordinators of overlapping networks deployed by other providers using a frame comprising the Coordination Request IE 1000. The Coordination Request IE 1000 may include an element ID 1002, a length field 1004, an options field 1006, and one or more other fields 1008.

The options field 1006 may indicate various options for the coordination and may comprise a sequence number, a type of request, a number of fields in the coordination request, and/or types of parameters in the Coordination Request IE 1000 (e.g., BSS discovery policy, etc.). The sequence number may identify the coordination request. The type of request may be, for example, a request for information (e.g., requesting settings and parameters from the destination provider coordinator) or a request for coordination with or without a list of proposed settings.

The fields 1008 may comprise one or more types of parameters that may be subject to coordination. The fields 1008 may comprise respective type subfields 1010 and contents subfields 1012. A type subfield 1010 may indicate the type of parameter specified in a field 1008, e.g., BSS discovery policy, etc. A contents subfield 1012 may specify the parameter indicated by a corresponding type subfield 1010. For example, in the case of a BSS discovery policy, the contents subfield 1012 may specify the BSS Discovery Policy. This subfield may be implemented using the BSS Discovery Policies. This subfield may include a subset of parameters of the BSS Discovery Policy, such as Active Scanning Frequency, BSS Scanning Method, Applicable STAs, etc.

When requested by another provider coordinator, a provider coordinator may respond with a frame containing a Coordination Response IE 1100, an example of which is shown in FIG. 11. The Coordination Response IE 1100 may comprise an element ID 1102, a length field 1104, an options field 1106, a results field 1108, and one or more other fields 1110. The results field 1108 may indicate the status of the coordination request and may have a value of Success or Reject. The results field 1108 may have alternative values. The results field 1108 may indicate that information on current settings and/or parameters as requested is provided. The results field 1108 may have a value of a sequence number, which may be the same as that included in the Coordination Request IE 1000.

The fields 1110 may comprise respective type subfields 1112 and contents subfields 1114. A type subfield 1112 may indicate that a corresponding contents subfield 1114 may contain an alternative value for BSS discovery policy, which may be different from the original value indicated in the Coordination Request IE 1000. The type subfield 1112 may indicate that the contents subfield 1114 may contain current values for a BSS discovery policy at the responding provider coordinator, which may be requested by the requesting provider coordinator as indicated in the Coordination Request IE 1000.

The Coordination Request IE 1000, the Coordination Response IE 1100, or any subset of the fields or subfields of the Coordination Request IE 1000 or the Coordination Response IE 1100 may be implemented as a field or subfield or subsets of subfields of any IE, or as a part of any control, management, or any other type of frames or in MAC/PLCP headers.

A provider coordinator may request information from other provider coordinators from the same or overlapping coverage areas. It may also request coordination on settings and parameters using proposed settings and parameters. When receiving a coordination request, a provider coordinator may provide any information on its own settings and parameters if requested. If it is requested to conduct coordination, it may evaluate whether the parameters and settings are acceptable. If they are acceptable, the responding provider coordinator may respond with a result code Success. Otherwise, the responding provider coordinator may reject the settings and parameters. It may also provide alternative settings that may be acceptable to the requesting provider coordinator. A requesting provider coordinator may start using new settings and parameters when other provider coordinators (e.g., all provider coordinators) have accepted its request. Once the new setting is accepted, the provider coordinator may configure its APs in the coverage area using the new parameters and settings.

For example, a provider coordinator, either triggered by the requests from the APs in its coverage area, or autonomously or periodically, may evaluate the performance of the BSSs in its coverage area. It may coordinate with other provider coordinators (e.g., all provider coordinators) in the overlapping coverage area for BSS Discovery Policy. For example, by limiting the active scanning frequency of probing stations, the number of probe requests may be reduced when stations are rejected for admission due to admission control policies so that admitted traffic and stations may experience improved performance, such as throughput or reduced delay. If provider coordinators in a coverage area agree on the BSS Discovery Policy, such configuration may be distributed by a provider coordinator (e.g., each provider coordinator) to the APs deployed by the same provider in its coverage area.

An AP may conduct BSS discovery policy coordination with its neighboring APs directly using a procedure that may be similar to the one used by provider coordinators described herein.

An AP may conduct BSS discovery policy coordination with its neighboring APs through a coordinator or an area coordinator that may or may not belong to a provider using a procedure that may be similar to the one used by provider coordinators described herein. The coordinator may be associated with a provider.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. A discovery method comprising:
    sending, by a station (STA), a first request frame to an access point (AP);
    receiving, by the STA, a response frame associated with the first request frame from the AP, wherein the response frame comprises a basic service set (BSS) discovery policy indicating a first BSS discovery method or a second BSS discovery method to be used by the STA in subsequent transmissions;
    sending, by the STA, a second request frame in accordance with the BSS discovery policy when the first BSS discovery method is indicated, wherein the first BSS discovery method comprises active scanning or fast initial link setup (FILS) active scanning; and
    refraining, by the STA, from sending the second request frame when the second BSS discovery method is indicated, wherein the second BSS discovery method comprises passive scanning.

2. The method of claim 1, wherein on a condition that the first BSS discovery policy is indicated, performing, by the STA, scanning of one or more channels based on the BSS discovery method.

3. The method of claim 1, further comprising sending, by the STA, the second request frame when time elapsed since last second request exceeds a minimum active scanning interval.

4. The method of claim 3, wherein the minimum active scanning interval is reciprocal of an active scanning frequency, wherein the minimum active scanning interval is defined one or more of per channel basis, per band basis, or per SSID basis.

5. The method of claim 1, wherein the response frame comprises identification of one or more BSSs that can accommodate the STA.

6. The method of claim 1, wherein the BSS discovery policy is associated with one or more of a provider, a BSS, an extended service set (ESS), an area, or per channel or resource blocks.

7. The method of claim 1, wherein one or more of the BSS discovery policy, a BSS, or an ESS are associated with a provider.

8. The method of claim 1, wherein the BSS discovery policy is associated with a type of STA.

9. The method of claim 1, wherein the first request frame or the second request frame is one of a probe request frame, an association request frame, or a re-association request frame, and wherein the response frame is one of a probe response frame, an association response frame, or a re-association response frame.

10. The method of claim 1, wherein the first BSS discovery method or the second BSS discovery method indicated is used for a period of time, wherein the period of time is defined per channel or per SSID.

11. A station (STA) comprising:
a processor configured to at least:
send a first request frame to an access point (AP);
receive a response frame associated with the first request frame from the AP, wherein the response frame comprises a basic service set (BSS) discovery policy indicating a first BSS discovery method or a second BSS discovery method to be used by the STA in subsequent transmissions;
send a second request frame in accordance with the BSS discovery policy when the first BSS discovery method is indicated, wherein the first BSS discovery method comprises active scanning or fast initial link setup (FILS) active scanning; and
refrain from sending the second request frame when the second BSS discovery method is indicated, wherein the second BSS discovery method comprises passive scanning.

12. The STA of claim 11, wherein on a condition that the first BSS discovery policy is indicated, the processor is further configured to perform scanning of one or more channels based on the BSS discovery method.

13. The STA of claim 11, wherein the processor is further configured to send the second request frame when time elapsed since last second request exceeds a minimum active scanning interval.

14. The STA of claim 13, wherein the minimum active scanning interval is reciprocal of an active scanning frequency, wherein the minimum active scanning interval is defined one or more of per channel basis, per band basis, or per SSID basis.

15. The STA of claim 11, wherein the response frame comprises identification of one or more BSSs that can accommodate the STA.

16. The STA of claim 11, wherein the BSS discovery policy is associated with one or more of a provider, a BSS, an extended service set (ESS), an area, or per channel or resource blocks.

17. The STA of claim 11, wherein one or more of the BSS discovery policy, a BSS, or an ESS are associated with a provider.

18. The STA of claim 11, wherein the BSS discovery policy is associated with a type of STA.

19. The STA of claim 11, wherein the first request frame or the second request frame is one of a probe request frame, an association request frame, or a re-association request frame, and wherein the response frame is one of a probe response frame, an association response frame, or a re-association response frame.

20. The STA of claim 11, wherein the first BSS discovery method or the second BSS discovery method indicated is used for a period of time, wherein the period of time is defined per channel or per SSID.

* * * * *